(12) United States Patent
Kakui (10) Patent No.: US 7,949,021 B2
(45) Date of Patent: May 24, 2011

(54) LIGHT SOURCE APPARATUS

(75) Inventor: Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 467 days.

(21) Appl. No.: 11/727,891

(22) Filed: Mar. 28, 2007

(65) Prior Publication Data

US 2008/0175279 A1 Jul. 24, 2008

(51) Int. Cl.
*H01S 5/00* (2006.01)
*H01S 5/50* (2006.01)
*H04B 10/17* (2006.01)

(52) U.S. Cl. .......... 372/25; 372/6; 372/10; 372/19; 359/341.1

(58) Field of Classification Search .......... 372/10, 372/25, 19, 6
See application file for complete search history.

(56) References Cited

U.S. PATENT DOCUMENTS

| | | | | |
|---|---|---|---|---|
| 5,933,271 | A * | 8/1999 | Waarts et al. | 359/341.31 |
| 5,974,060 | A * | 10/1999 | Byren et al. | 372/19 |
| 7,538,936 | B2 * | 5/2009 | Yokoyama | 359/328 |
| 2001/0043324 | A1 * | 11/2001 | Sakairi | 356/73.1 |
| 2005/0225846 | A1 * | 10/2005 | Nati et al. | 359/341.1 |
| 2006/0133432 | A1 * | 6/2006 | Dragic | 372/6 |
| 2006/0176913 | A1 * | 8/2006 | Souhaite et al. | 372/10 |
| 2006/0268950 | A1 * | 11/2006 | Kane | 372/30 |

FOREIGN PATENT DOCUMENTS

| | | |
|---|---|---|
| JP | 57-84763 | 5/1982 |
| JP | 05-090888 | 4/1993 |
| JP | 2000-503478 | 3/2000 |
| JP | 2001-281102 | 10/2001 |
| JP | 2005-243879 | 9/2005 |
| WO | WO 97/26688 | 7/1997 |

OTHER PUBLICATIONS

Limpert, j., et al., "Sub-10 ns Q-switched Yb-doped photonic crystal fiber laser", CLEO 2005, Tech. Dig., pp. 1-3, JWB51.

(Continued)

*Primary Examiner* — Minsun Harvey
*Assistant Examiner* — Michael Carter
(74) *Attorney, Agent, or Firm* — McDermott Will & Emery LLP (57) ABSTRACT

The present invention relates to a light source apparatus having a structure to enable a short pulse optical output with high pulse energy or a high pulse peak equivalent to that of a Q switch laser light source. The light source apparatus comprises a seed light source, a pre-stage optical amplifier, a subsequent-stage optical amplifier, and a control section. After the pulse light outputted from the seed light source is amplified by the pre-stage optical amplifier, the pulse light is amplified further by the subsequent-stage optical amplifier. In the subsequent-stage optical amplifier, a ring-type resonator is constituted by an optical coupler, an optical coupler, an optical amplification waveguide, an optical isolator, an optical coupler, an optical waveguide, a lens, a Q switch, a lens, and an optical waveguide that are disposed sequentially on the propagation path of the pulse light. The control section controls a Q switch such that the resonator loss of the resonator in the subsequent-stage optical amplifier is minimal with the timing at which the pulse light is inputted to the subsequent-stage optical amplifier.

20 Claims, 6 Drawing Sheets

OTHER PUBLICATIONS

Babushkin, A., et al., "Multi-kilowatt peak power pulsed fiber laser with precise computer controlled pulse duration for materials processing", Proceedings of SPIE, 2005, pp. 98-102, vol. 5709.

Brown, AJW., "Fiber Laser Development at Aculight Corporation", 63$^{rd}$ Laser Machining Scientific Society Compendium, 2005.

S. Basu et al, "Short Pulse Injection Seeding of Q-Switched Nd: Glass Laser Oscillators—Theory and Experiment," IEEE Journal of Quantum Electronics, U.S., vol:26 Issue:1, Jan. 1990, pp. 149-157.

Japanese Notice of Reasons for Rejection, w/ English translation thereof, Issued in Japanese Patent Application No. JP 2005-284225 dated Feb. 8, 2011.

\* cited by examiner

LIGHT SOURCE APPARATUS

BACKGROUND OF THE INVENTION

1. Field of the Invention

The present invention relates to a light source apparatus with a MOPA constitution that comprises a seed light source and an optical amplifier.

2. Related Background Art

As industrial laser light sources such as machine laser light sources in the fields of electronics and mechanics, medical laser scalpel laser light sources, length-measuring or other measurement laser light sources, pulse oscillation laser light sources that employ Q switches have been widely used. A Q switch obtains pulse light with a high peak power by modulating the resonance loss of the resonator. As the method of implementing the Q switch, a method that effectively modulates the reflectance of a reflective mirror that constitutes a resonator by means of an optical switch due to the acousto-optic (AO) effect, for example, is the most general and widely prevalent.

A optical fiber laser light source that employs a Q switch has a constitution in which pumping light in the 975 nm wavelength band is supplied to a Yb-doped optical fiber (YbDF) that is an optical amplification waveguide doped with yttrium (Yb), for example. ASE (Amplified Spontaneous Emission) light is emitted by YbDF for which an inverted population is formed through the supply of this pumping light. Normally, RF power is not applied to an AO switch and the ASE output of the YbDF is outputted to the non-reflecting end as zero-order diffraction light. However, when RF power is applied to the AO switch, the direction of the ASE output of the YbDF is changed by the AO diffraction effect. Thereupon, the ASE light is irradiated onto a reflective mirror that is disposed at the tip of the YbDF. Hence, laser resonance is emitted. Further, the energy that has accumulated as a result of the formation of an inverted population in the optical amplifier waveguide is released at one burst such that a high-power optical pulse is produced.

Further, the Q switch laser light source is not limited to the optical fiber laser light source above. A fixed laser light source and gas laser light source can also be implemented. The optical fiber laser light source has a small space coupling part, and is highly reliable and compact. Further, the optical fiber laser light source is practical because the beam quality is stable and good. However, as compared with a fixed laser light source (particularly a disk laser light source), the optical fiber laser light source is generally long with a resonator length of a few meters. For this reason, with the Q switch, the optical propagation time of the resonator is several tens of nanoseconds and there is also the drawback that an optical pulse of a shorter width cannot be produced.

Normally, the energy of the laser light irradiated onto the machine object in laser machining changes from the electrons to lattice vibration and then to heat. However, the shift of energy from the lattice into heat is mostly produced on a time scale of about 10 nanoseconds. Hence, when pulse laser light with a pulse width that is shorter than the time scale is irradiated, adiabatic machining of the machine object is possible. For example, in the case of drilling, an effect such as a small burr at the outer perimeter of the hole is obtained. In order to shorten the pulse width of the Q switch, an example in which the resonator length is kept at 70 cm also exists in J. Limpert, et al, "Sub-10 nsQ-switched Yb-doped photonic crystal fiber laser", CLEO2005, Tech.Dig., JWB51 (Document 1). However, when the alignment of the lens system required in front of and behind the AO switch and the difficulty when welding the YbDF (a margin on the order of 40 to 50 cm is required at one end for placement in the welder) are considered, it is said to be unrealistic.

As a technology for counteracting the drawbacks of the optical fiber laser light source, a light source apparatus with a MOPA (Master Oscillator Power Amplifier) constitution is known. The light source apparatus with a MOPA constitution has a constitution that amplifies the light that is outputted from the seed light source by means of an optical amplifier and is able to output high power light. In other words, A. Babushkin, et al., "Multi-kilowatt peak power pulsed fiber laser with precise computer controlled pulse duration for materials processing", Proc. of SPIE Vol. 5709, pp 98 to 102 (Document 2) describes a constitution that amplifies pulse light of a wavelength of 1064 nm that is outputted from the semiconductor laser light source by means of an optical amplifier such that a high-power pulse light output with a pulse repetition frequency of 10 to 140 kHz, a pulse width of 4 to 250 nanoseconds, an average power of 8.5 W, and a peak power of 40 kW is obtained. However, A. J. W. Brown, "Fiber laser development at Aculight Corporation", $63^{rd}$ Laser Machining Scientific Society compendium, 2005 (Document 3) describes a constitution in which pulse light outputted from a seed light source is amplified by an optical amplifier such that a pulse light output with a high pulse repetition frequency of several hundred kHz to several hundred MHz is obtained.

SUMMARY OF THE INVENTION

The inventors have studied the above prior art, and as a result, have found problems as follows.

In other words, as compared with a Q-switch laser light source that releases energy at one burst that has accumulated as a result of the formation of an inverted population state in the optical amplifier waveguide, a light source apparatus with a MOPA constitution inevitably has a lower pulse energy and pulse peak. There is also the problem with the light source apparatus with only a MOPA constitution that the ASE light causes the machining quality to deteriorate.

In order to overcome the above-mentioned problems, it is an object of the present invention to provide a light source apparatus that comprises an optical amplifier that has, as an optical amplification medium, an optical amplification waveguide, the light source apparatus being capable of outputting short pulse light with a high pulse energy or pulse peak up to the same magnitude as a Q switch laser light source.

In order to solve the above problem, the light source apparatus of the present invention comprises a seed light source, a first optical amplifier, and a control section. The seed light source outputs pulse light. The first optical amplifier is an optical amplifier inputting pulse light outputted from the seed light source and outputting the amplified pulse light, and comprises an optical amplification waveguide having an optical amplification function and pumping light supply means. The optical amplification waveguide is rendered by doping its optical waveguide region with an amplification element. The pumping light supply means supplies pumping light for pumping the amplification element to the optical amplification waveguide. The control section controls the seed light source so that the output cycle of the pulse light is the same or greater than the pumping lifespan of the amplification element, more specifically, greater than $\frac{1}{10}$ of the pumping lifespan. As a result of this constitution, energy that has accumulated as an inverted population in the optical amplification waveguide thus far is released when the pulse light outputted from the seed light source is inputted to the first optical amplifier, the energy that has accumulated as an inverted population in the optical amplification waveguide thus far is released. Further, an 'amplification element that amplifies light' includes rare earth elements and some transition metal elements (Bi, Cr, Ni or the like), for example.

Furthermore, in the case of the light source apparatus according to the present invention, the first optical amplifier may comprise a resonator, pumping supply means, and Q switch means. An optical amplification waveguide having an optical amplification function and rendered by doping an optical waveguide region with an amplification element for amplifying light is disposed in the resonance light path of the resonator. The pumping light supply means supplies pumping light that excites the amplification element to the optical amplification waveguide. The Q-switch means modulates the resonator loss of the resonator. The control section controls the Q switch means so that the pulse light is amplified during the resonance state of the resonator in sync with the timing with which the pulse light is inputted to the first optical amplifier. In addition, the control section may control the Q switch means such that the pulse light is amplified in the resonance state of the resonator and control the Q switch means so that the modulation cycle of the resonator loss is N times (where N is an integer of two or more) the pulse light output cycle of the seed light source.

The light source apparatus according to the present invention which has the above structure may further comprise a second optical amplifier that is disposed between the seed light source and the first optical amplifier. The second optical amplifier inputs the pulse light outputted from the seed light source and outputs the amplified pulse light to the first optical amplifier.

In the case of the light source apparatus according to the present invention, the seed light source preferably comprises a semiconductor laser element that is directly modulated by the control section. In this case, the pulse light with a small pulse width can be easily outputted from the seed light source. Further, the extinction ratio of the pulse light that is outputted from the seed light source, that is, the ratio of the peak value of the pulse light with respect to the optical power in the inter-pulse time region is preferably secured at 1000 times or more. In cases where a semiconductor laser element that is directly modulated is applied as the seed light source, such an extinction ratio can be implemented by setting the inter-pulse current set value at or below the threshold value current of the semiconductor laser element. In cases where the above extinction ratio is not secured, the pulse light outputted from the light source apparatus cannot be adequately raised above the temporal average and cannot be applied to applications requiring a high pulse peak power such as a machining laser light source and medical laser scalpel.

The light source apparatus of the present invention may further comprise means for variably setting any one of the timing for outputting the pulse light of the seed light source and the timing for controlling the Q-switch means. The provision of such means makes it possible to adjust at least either one of the delay amount of the pulse modulation of the seed light source or the delay amount to minimize the resonator loss of the resonator.

In the case of the light source apparatus according to the present invention, the pulse width of the pulse light is set or can be set so as to be narrower than the pulse width of the pulse-oscillated output light from the first optical amplifier in a circumstance where only the pumping light is supplied in a state where pulse light has not been inputted to the first optical amplifier. In this case, the thermal effect on the irradiated object that originates from the high-energy pulse irradiation is effectively suppressed. Here, 'can be set' signifies that a function or means allowing settings to be made is provided and that settings can be made when such a function or means are actually used.

In addition, in the case of the light source apparatus according to the present invention, the pulse width of the pulse light outputted from the seed light source is set or can be set at 16 nanoseconds or less. In this case, the effect of induced Brillouin scattering (SBS) is effectively suppressed. Here, 'can be set' signifies that a function or means allowing settings to be made is provided and that settings can be made when such a function or means are actually used.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of a light source apparatus according to the present invention will be explained in detail with reference to FIGS. 1 to 6. In the explanation of the drawings, constituents identical to each other will be referred to with numerals identical to each other without repeating their overlapping descriptions.

First Embodiment

Figure 1:
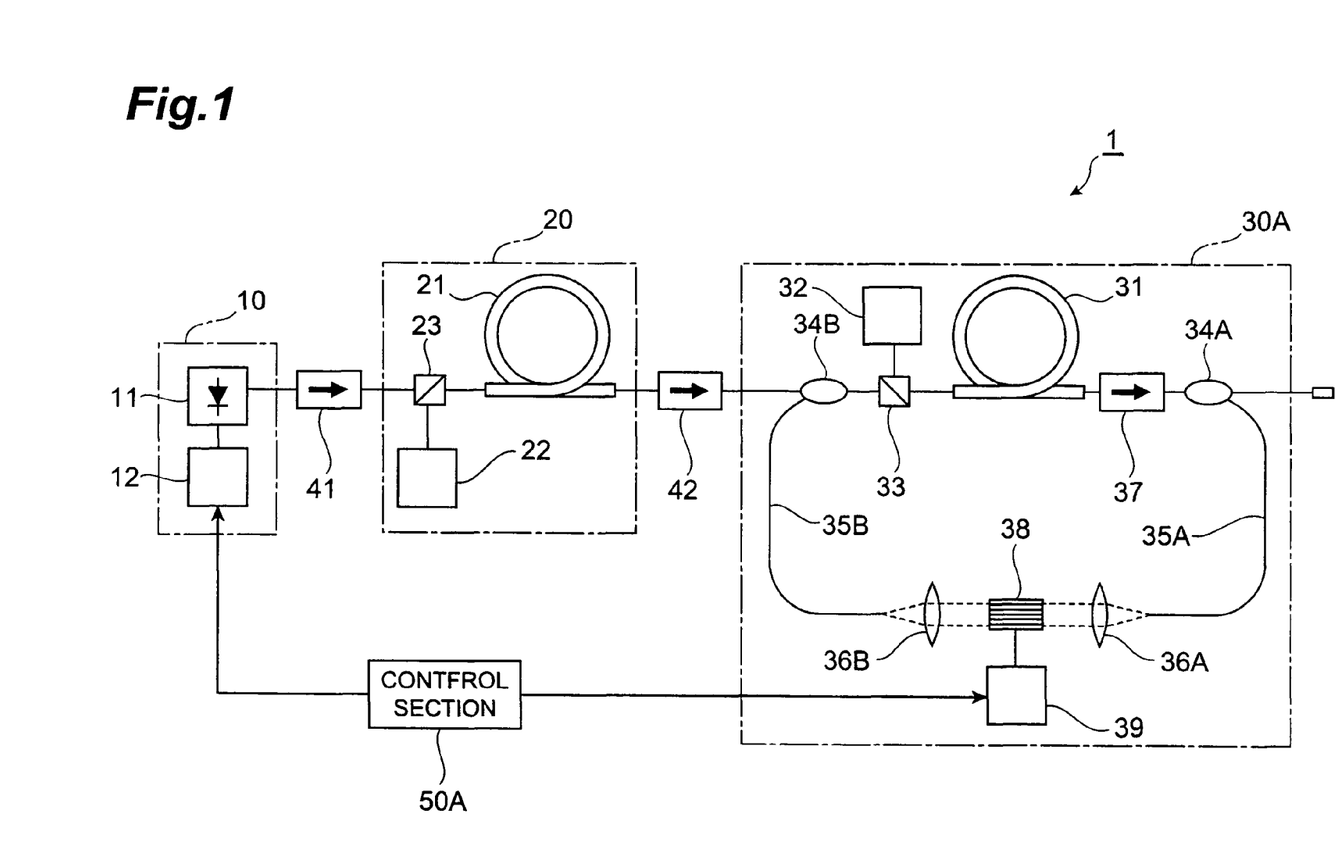
FIG. 1 shows the constitution of the first embodiment of the light source apparatus of the present invention.

First, a first embodiment of the light source apparatus of the present invention will be described. FIG. 1 shows the constitution of the first embodiment of the light source apparatus according to the present invention. The light source apparatus 1 shown in FIG. 1 comprises a seed light source 10, a pre-stage optical amplifier 20 (second optical amplifier), a subsequent stage optical amplifier 30A (first optical amplifier), optical isolator 41, an optical isolator 42, and a control section 50A.

The seed light source 10 outputs pulse light in a fixed repetition cycle. The seed light source 10 comprises a semiconductor laser element 11 and a driving section 12. The driving section 12 generates a fixed cycle drive signal and supplies the drive signal to the semiconductor laser element 11. The semiconductor laser element 11 has its output optical power directly modulated in accordance with the drive signal.

The pre-stage optical amplifier 20 inputs pulse light having arrived via the optical isolator 41 from the seed light source 10 and amplifies this pulse light. This pre-stage optical amplifier 20 comprises an optical amplification waveguide 21, a pumping light source 22, and an optical coupler 23. The optical amplification waveguide 21 is an optical waveguide rendered by doping an optical waveguide region with an amplification element (rare earth element or transition metal element, for example) for amplifying light of a predetermined wavelength. As the optical amplification waveguide 21, for example, an optical fiber rendered by doping the optical waveguide region with an Yb element can be applied. The pumping light source 22 continuously outputs pumping light for pumping the amplification element with which the optical amplification waveguide 21 is doped. The optical coupler 23 outputs pulse light that arrives from the optical isolator 41 to the optical amplification waveguide 21 and outputs pumping light that arrives from the pumping light source 22 to the optical amplification waveguide 21. Thus, the pulse light is amplified by inputting pulse light to the optical amplification waveguide 21 in an inverted population state as a result of the supply of pumping light.

The subsequent-stage optical amplifier 30A further amplifies the pulse light that has undergone primary amplification that arrives via the optical isolator 42 from the pre-stage optical amplifier 20. The subsequent-stage optical amplifier 30A comprises an optical amplification waveguide 31, a pumping light source 32, an optical coupler 33, optical couplers 34A, 34B, optical waveguides 35A, 35B, lenses 36A, 36B, an optical isolator 37, a Q switch 38, and a driving section 39.

The optical amplification waveguide 31 is an optical waveguide rendered by doping the optical waveguide region with an amplification element and comprises an optical fiber produced by doping the optical waveguide region with an Yb element, for example. The pumping light source 32 continuously outputs pumping light for pumping an amplification element with which the optical amplification waveguide 31 is doped. The optical coupler 33 outputs pulse light that arrives from optical coupler 34B to the optical amplification waveguide 31 and also outputs pumping light that has arrived from the pumping light source 32 to the optical amplification waveguide 31. The pulse light is amplified as a result of inputting pulse light to the optical amplification waveguide 31 in which an inverted population state is formed by the supply of pumping light.

The optical coupler 34A, after inputting the pulse light that arrives via an optical isolator 37 from the optical amplification waveguide 31, guides part of the pulse light toward the optical waveguide 35A and outputs the remainder of the pulse light to the subsequent-stage optical amplifier 30A. The optical waveguide 35A transmits part of the pulse light split by the optical coupler 34A (inputting pulse light from the optical coupler 34A thereto its one end and emitting pulse light that was transmitted within the optical waveguide 35A from its other end). The lens 36A collimates pulse light that is emitted from the other end of the optical waveguide 35A and inserts the collimated pulse light to the Q switch 38.

The lens 36B condenses the pulse light that arrives from the Q switch 38 and makes the condensed pulse light enter to one end of the optical waveguide 35B. The optical waveguide 35B transmits the pulse light that was condensed by the lens 36B (pulse light from lens 36B is made to enter via one end and the pulse light transmitted within the optical waveguide 35B exits via the other end). The optical coupler 34B outputs the pulse light having arrived from the optical isolator 42 to the optical coupler 33 and outputs the pulse light arriving via the optical waveguide 35B to the optical coupler 33.

The Q switch 38 is provided between the lens 36A and the lens 36B and preferably comprises an optical switch (AO switch) as a result of the acousto-optic (AO) effect. Further, as long as the Q switch 38 has an adequately rapid switch switching time, the Q switch 38 is not limited to an AO switch; the Q switch 38 could also be another switch. For example, this may also be a switch comprising a piezoelectric element comprising a high-speed driver. Further, the Q switch may be a variable optical attenuator when the time required to change the optical attenuation amount is shortened to the same length as the switch switching time. This Q switch 38 is driven by the driving section 39 and modulates the coupling of pulse light with the input end of the optical waveguide 35B from the output end of the optical waveguide 35A.

In the case of the subsequent-stage optical amplifier 30A, a ring-type resonator is constituted by the optical coupler 34B, the optical coupler 33, the optical amplification waveguide 31, the optical isolator 37, the optical coupler 34A, the optical waveguide 35A, the lens 36A, the Q switch 38, the lens 36B, and the optical waveguide 35B, which are disposed sequentially along the propagation path of the pulse light. The Q switch 38 and driving section 39 constitute Q switch means that modulate the resonator loss of the resonator. Further, the pumping light source 32 and optical coupler 33 constitute pumping light supply means for continuously supplying pumping light to the optical amplification waveguide 31.

The control section 50A controls the Q switch means to minimize the resonator loss of the resonator in the subsequent-stage optical amplifier 30A with the timing at which the pulse light outputted from the seed light source 10 is inputted to the subsequent-stage optical amplifier 30A after being amplified by the pre-stage optical amplifier 20.

The light source apparatus 1 according to the first embodiment operates as follows under the control of the control section 50A. In the pre-stage optical amplifier 20, the pumping light outputted from the pumping light source 22 is continuously supplied to the optical amplification waveguide 21 via the optical coupler 23. Further, in the subsequent-stage optical amplifier 30A, the pumping light outputted from the pumping light source 32 is continuously supplied to the optical amplification waveguide 31 via the optical coupler 33. Furthermore, in the seed light source 10, pulse light is outputted in fixed repetition cycles by the semiconductor laser element 11 that is driven by the driving section 12.

The pulse light outputted from the seed light source 10 is inputted to the pre-stage optical amplifier 20 via the optical isolator 41. The pulse light inputted to the pre-stage optical amplifier 20 is inputted to the optical amplification waveguide 21 via the optical coupler 23 and undergoes primary amplification in the optical amplification waveguide 21. The pulse light outputted from the pre-stage optical amplifier 20 is inputted to the subsequent-stage optical amplifier 30A via the optical isolator 42.

The pulse light inputted to the subsequent-stage optical amplifier 30A is inputted to the optical amplification waveguide 31 via the optical coupler 34B and optical coupler 33 together with the pulse light that has arrived via the optical light waveguide 35B and undergoes secondary amplification in the optical amplification waveguide 31. The pulse light amplified in the optical amplification waveguide 31 is inputted to the optical coupler 34A via the optical isolator 37. The part of the pulse light is inputted to the optical waveguide 35A by the optical coupler 34A while the remainder of the pulse light is outputted to the outside of the subsequent-stage optical amplifier 30A.

The pulse light inputted to the optical waveguide 35A by the optical coupler 34A is outputted from the exit end of the optical waveguide 35A after being guided by the optical waveguide 35A. Thereafter, the output pulse light is collimated by the lens 36A and the collimated pulse light is inputted to the Q switch 38. The resonator loss of the resonator in the subsequent-stage optical amplifier 30A is minimal with the timing at which pulse light is inputted to the subsequent-stage optical amplifier 30A. In other words, pulse light that is inputted from the lens 36A to the Q switch 38 passes via the Q switch 38 and is then inputted to the input end of the optical waveguide 35B after being condensed by the lens 36B.

The pulse light that is inputted by the lens 36B to the optical waveguide 35B is guided by the optical waveguide 35B before being inputted to the optical amplification waveguide 31 via the optical coupler 34B and optical coupler 33. Thus, the pulse light inputted to the subsequent-stage optical amplifier 30A is amplified in the ring-type resonator before being outputted to the outside of the subsequent-stage optical amplifier 30A via the optical coupler 34A.

The resonator loss of the resonator in the subsequent-stage optical amplifier 30A is not minimized before the pulse light is inputted to the subsequent-stage optical amplifier 30A. The energy of the pumping light that is supplied by the pumping light source 32 to the optical amplification waveguide 31 via the optical coupler 33 is accumulated by the formation of an inverted population in the optical amplification waveguide 31. Further, the resonator loss of the resonator in the subsequent-stage optical amplifier 30A is minimal with the timing at which the pulse light is inputted to the subsequent-stage optical amplifier 30A. Therefore, the inputted pulse light is subjected to optical amplification with a high gain by means of the pumping energy that has accumulated as an inverted population in the optical amplification waveguide 31 thus far. Furthermore, there is barely any variation in the pulse width of the pulse light before or after amplification. Hence, the light source apparatus 1 is able to output short pulse light with a high pulse peak or high pulse energy that compares favorably with the case of a Q switch laser light source.

Further, the control section 50A preferably adjusts the delay between the two timings by controlling the timing with which the seed light source 10 outputs pulse light and controls the timing with which the resonator loss of the resonator in the subsequent-stage optical amplifier 30A is minimal. In this case, the Q switch means can be controlled such that the resonator loss of the resonator in the subsequent-stage optical amplifier 30A is minimal with the timing at which the pulse light is inputted to the subsequent-stage optical amplifier 30A.

Further, even in a case where the pulse light does not enter the subsequent-stage optical amplifier 30A, the subsequent-stage optical amplifier 30A performs pulse oscillation by means of the action of the Q switch means (pulse light output is possible). In this case, as compared with the pulse width of the pulse light that is outputted from the subsequent-stage optical amplifier 30A, the pulse width of the pulse light outputted from the seed light source 10 is preferably narrow. This is because the thermal effect on the irradiated object owing to the high-energy pulse irradiation can be effectively suppressed. Furthermore, the pulse width of the pulse light which is outputted from the seed light source 10 may be 16 nanoseconds or less. In this case, the effect of induced Brillouin scattering (SBS) can be effectively suppressed.

The cycle of the modulation of the resonator loss of the resonator in the subsequent-stage optical amplifier 30A may match the cycle of the pulse light output of the seed light source 10 and may be N times (where N is an integer of two or more) the cycle of the pulse light output in the seed light source 10. In the latter case, it is expected that a cyclical mixture of (N−1) small pulses and one large pulse arise at the output from the light source apparatus 1, with the (N−1) small pulses having the effect of providing preheat.

Two specific samples 1, 2 of the light source apparatus 1 according to the first embodiment will be described next.

The semiconductor laser element 11 that is contained in the seed light source 10 of the light source apparatus of sample 1 outputs pulse light with a wavelength of 1064 nm, a peak power of 100 mW, a repetition frequency of 20 kHz, and a pulse width of 10 nanoseconds. In the pre-stage optical amplifier 20, the optical amplification waveguide 21 is a Yb-element-doped optical fiber (YbDF), the wavelength of the pumping light outputted from the pumping light source 22 is 975 nm, the gain is 20 dB, and the peak power of the pulse light inputted to the subsequent-stage optical amplifier 30A is set at 10 W. Further, the amplification of the pre-stage optical amplifier 20 may be implemented by means of cladding pumping. However, because the temporal average output is on the order of a few mW to several dozen W, this temporal average output can also be adequately applied in core pumping that is employed in normal optical communications.

In the subsequent-stage optical amplifier 30A, YbDF with a dual-layer cladding structure is applied to the optical amplification waveguide 31. The length of the YbDF is 5 meters, the core diameter is 10 μm, the internal cladding diameter is 125 μm, and the non-saturation peak in the 975 nm wavelength band is 11.7 dB/m and undergoes cladding pumping. The wavelength of the pumping light that is continuously outputted from the pumping light source 32 was set at 915 nm and the power of the pumping light was set at 15.8 W. The switch repetition frequency of the Q switch 38 was 20 kHz and the required switching time was 500 nanoseconds.

Figure 2:
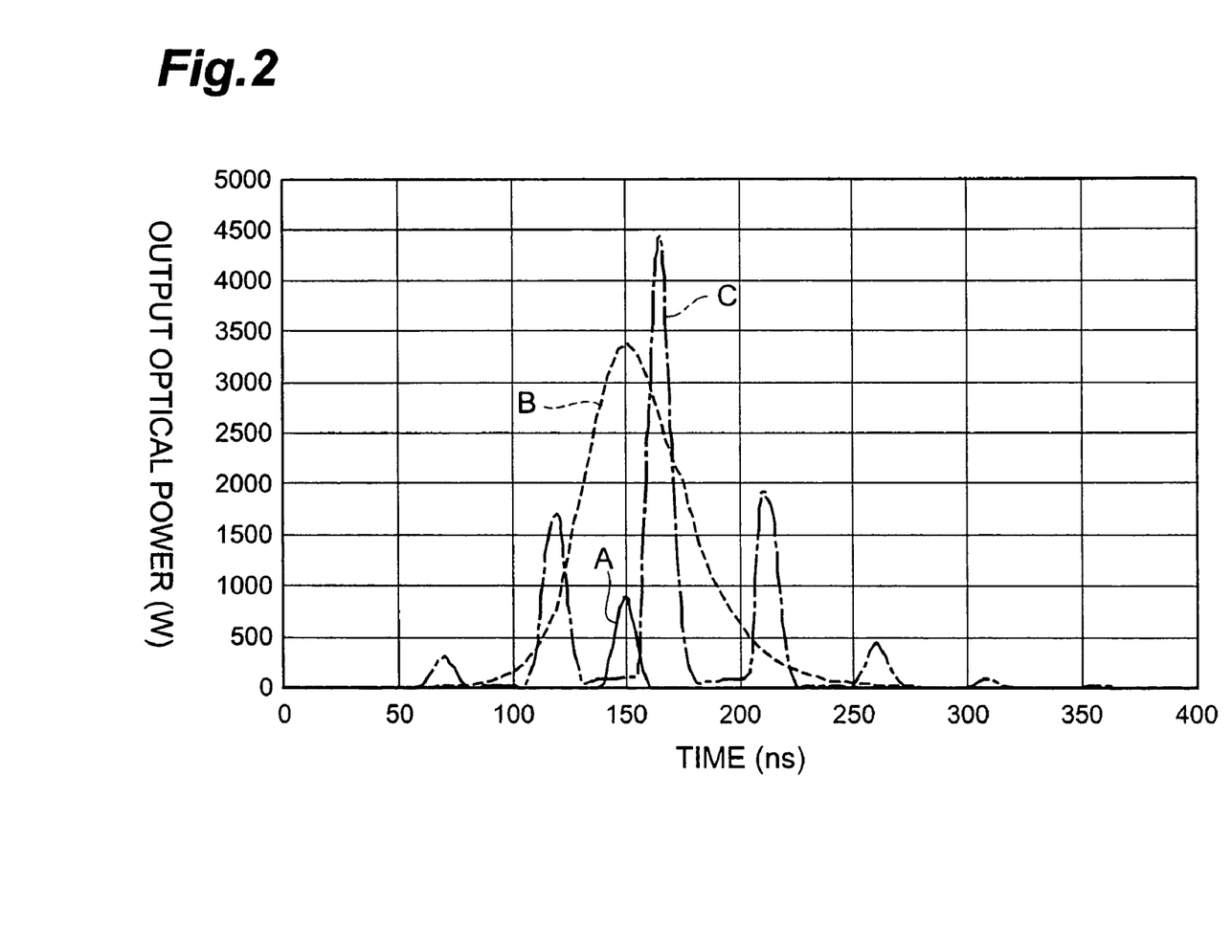
FIG. 2 is a temporal waveform of outputted pulse light of a sample 1 that is prepared for a light source apparatus according to a first embodiment.

FIG. 2 is a temporal waveform for pulse light that is outputted from the light source apparatus according to the sample 1. In FIG. 2, waveform A indicates an output pulse light temporal waveform for a case where pulse light outputted from the seed light source 10 is amplified by the pre-stage optical amplifier 20 and subsequent-stage optical amplifier 30A with the resonator loss of the resonator always minimized by the Q switch 38 in the subsequent-stage optical amplifier 30A (that is, in the case of a conventional simple MOPA constitution). Waveform B indicates an output pulse light temporal waveform for a case where the resonator loss of the resonator is modulated by the Q switch 38 in the subsequent-stage optical amplifier 30A in a state where the pulse light is not outputted from the seed light source 10. Further, waveform C represents an output pulse light temporal waveform for a case where pulse light is outputted from the seed light source 10 and the resonator loss of the resonator is modulated by the Q switch 38 in the subsequent-stage optical amplifier 30A. Further, waveform A and waveform B are waveform data of a comparative example, and waveform C is waveform data for sample 1.

The following is clear from FIG. 2. In other words, as indicated by waveform A, in the case of a simple MOPA constitution, peak power only on the order of 900 W is obtained for the output pulse light from the light source apparatus and the pulse energy is limited to 11.6 μJ. Further, as indicated by waveform B, in the case of a constitution with only a Q switch, the peak power reaches 3.3 kW and the pulse energy is 0.190 mJ for the output pulse light from the light source apparatus and reaches a level approximately seventeen times that of waveform A, while the pulse width is on the order of 50 nanoseconds long (an undesirable thermal effect on a target onto which the high-energy pulse is irradiated is a matter of concern).

In contrast, as indicated by waveform C, in the constitution of sample 1, a plurality of pulses with a pulse width of 10 nanoseconds are generated in the same way as for waveform A by the output light from the light source apparatus and the peak power is a maximum of 4.4 kW, which exceeds the case of waveform B. However, even when the sum total of the pulse energy is taken for all the pulse light, the value is 0.107 mJ, which is unattainable in the case of waveform B and is approximately ten times that of the case of waveform A. Further, relative to the pulse width, the pulse width of 10 nanoseconds of the light source 10 is maintained and a shorter pulse is possible by using a seed light source 10 that permits a higher frequency modulation. For example, in the case of direct modulation of the semiconductor laser element, gain switching may be applied to the seed light source 10 and a mode lock laser structure may be applied.

Figure 3:
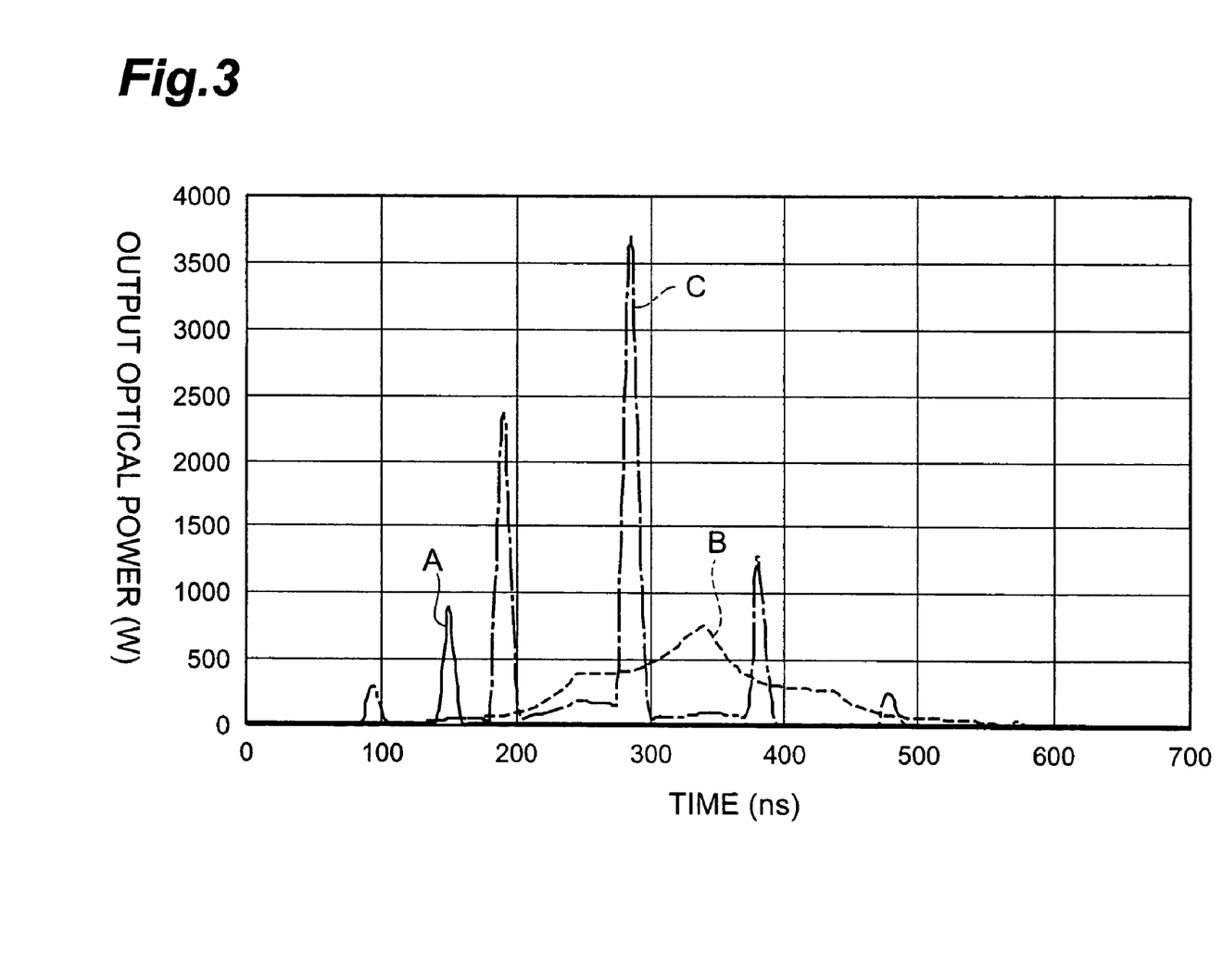
FIG. 3 is a temporal waveform of outputted pulse light of a sample 2 that is prepared for the light source apparatus according to the first embodiment.

In the case of the light source apparatus of sample 2, YbDF, which is applied to the optical amplification waveguide 31 that is contained in the subsequent-stage optical amplifier 30A, has a length of 10 meters (two times as long as sample 1) and the Yb density is set at ½ that for sample 1. The other conditions of this sample 2 are the same as in the case of sample 1. FIG. 3 is the temporal waveform of the pulse light that is outputted from the light source apparatus according to sample 2. Waveforms A to C in FIG. 3 are waveform data for each of the above structures.

As compared with sample 1, the cycle time of the resonator of the subsequent-stage optical amplifier 30A is long for sample 2. Therefore, in a case where the resonator loss of the resonator is modulated by the Q switch 38 in the subsequent-stage optical amplifier 30A in a state where pulse light is not outputted from the seed light source 10, the width of the pulse light outputted from the light source apparatus widens as indicated by waveform B. Further, the pulse peak power is only 800 W and the pulse energy is 0.111 mJ and lower than that for sample 1.

In contrast, as shown in waveform C, for sample 2, the pulse peak power reaches 3700 W and the pulse energy is 0.110 mJ. In other words, the case of sample 2 compares favorably with a constitution with only the Q switch also with respect to the pulse energy. Only the benefit that an optical pulse with a high peak and narrow pulse width is obtained then exists. Thus, the light source apparatus 1 according to the first embodiment can exhibit a particular effect in a case where the resonance light path length of the resonator in the subsequent-stage optical amplifier 30A is long.

Second Embodiment

Figure 4:
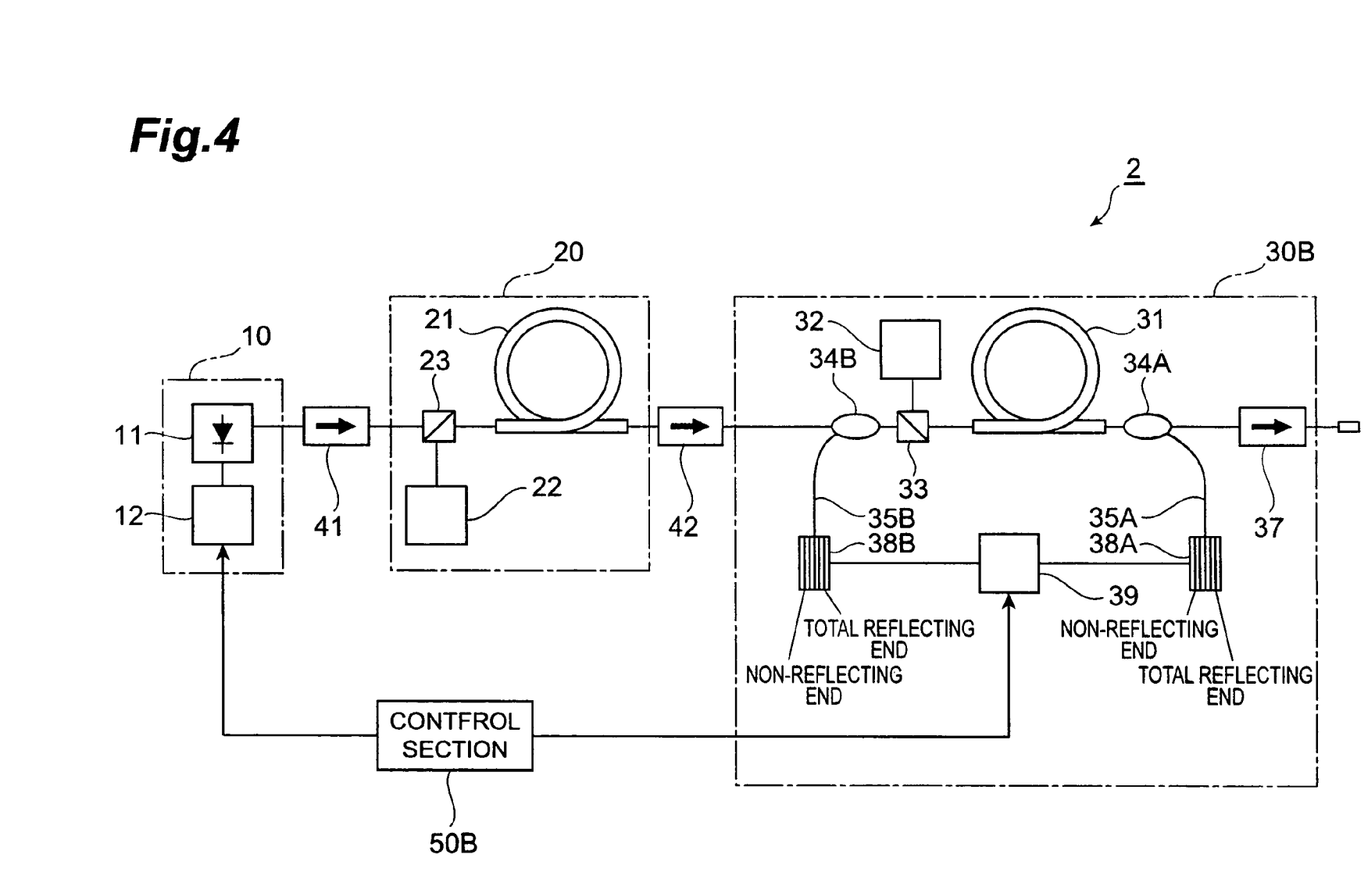
FIG. 4 shows the constitution of a second embodiment of the light source apparatus according to the present invention.

The second embodiment of the light source apparatus according to the present invention will be described next. FIG. 4 shows the constitution of the second embodiment of the light source apparatus according to the present invention. The light source apparatus 2 according to the second embodiment shown in FIG. 4 comprises the light source apparatus 10, the pre-stage optical amplifier 20 (second optical amplifier), a subsequent-stage optical amplifier 30B (first optical amplifier), the optical isolator 41, the optical isolator 42, and a control section 50B. As compared with the light source apparatus 1 according to the first embodiment shown in FIG. 1, the light source apparatus 2 according to the second embodiment is different by virtue of comprising the subsequent-stage optical amplifier 30B in place of the subsequent-stage optical amplifier 30A and by virtue of comprising the control section 50B instead of the control section 50A.

The subsequent-stage optical amplifier 30B inputs pulse light that arrives from the pre-stage optical amplifier 20 via the optical isolator 42 (pulse light that undergoes primary amplification by means of the pre-stage optical amplifier 20) and further amplifies the pulse light. The subsequent-stage optical amplifier 30B comprises the optical amplification waveguide 31, the pumping light source 32, the optical coupler 33, optical couplers 34A, 34B, optical waveguides 35A, 35B, an optical isolator 37, Q switches 38A, 38B and a driving section 39.

The optical amplification waveguide 31 is an optical waveguide rendered by doping the optical waveguide region with an amplification element and comprises an optical fiber rendered by doping the optical waveguide region with a Yb element, for example. The pumping light source 32 is a seed light source that continuously outputs pumping light that excites the doped amplification element to the optical amplification waveguide 31. The optical coupler 33 outputs the pulse light arriving from the optical coupler 34B to the optical amplification waveguide 31 and also outputs pumping light arriving from the pumping light source 32 to the optical amplification waveguide 31. The inputted pulse light is amplified by the optical amplification waveguide 31 in which an inverted population state is formed by the supply of pumping light.

The optical coupler 34A inputs pulse light that has arrived from the optical amplification waveguide 31 and guides part of the pulse light to the optical waveguide 35A while outputting the remainder of the pulse light to the outside of the subsequent-stage optical amplifier 30B via the optical isolator 37. Further, the optical coupler 34A inputs pulse light that has been transmitted by the optical waveguide 35A and outputs the pulse light to the optical amplification waveguide 31. The optical waveguide 35A guides part of the pulse light that has been split by the optical coupler 34A to the Q switch 38A (the pulse light from the optical coupler 34A is inputted via one end of the optical waveguide 35A and is outputted from the other end thereof to the Q switch 38A). The Q switch 38A is provided at the other end of the optical waveguide 35A and driven by the driving section 39. The Q switch 38A guides the light that is outputted from the other end of the optical waveguide 35A to the non-reflecting end or total-reflection end.

The optical coupler 34B outputs the pulse light arriving from the optical isolator 42 to the optical coupler 33 and also outputs pulse light that has been transmitted by the optical waveguide 35B to the optical coupler 33. Furthermore, the optical coupler 34B inputs pulse light that arrives from the optical amplification waveguide 31 and guides part of the pulse light to the optical waveguide 35B. The optical waveguide 35B transmits part of the pulse light split by the optical coupler 34B and outputs the same to the Q switch 38A. The Q switch 38B is provided at the other end of the optical waveguide 35B and is driven by the driving section 39. The Q switch 38B guides light that is outputted from the other end of the optical waveguide 35B to the non-reflecting end or total-reflection end.

Each of the Q switches 38A, 38B is preferably an optical switch that employs the acousto-optic (AO) effect (an AO switch). Furthermore, as long as each of the Q switches 38A, 38B have an adequately rapid switch switching time, the same are not limited to AO switches. The respective Q switches 35A, 38B may be switches that comprise piezoelectric elements comprising high-speed drivers, for example or may be variable optical attenuators as long as the time required to change the optical attenuation amount is as short as the switch switching time.

In the subsequent-stage optical amplifier 30B, a Fabry-Perot-type resonator is constituted by the Q switch 38A, the optical waveguide 35A, the optical coupler 34A, the optical amplification waveguide 31, the optical coupler 33, the optical coupler 34B, the optical waveguide 35B, and the Q switch 38B, which are disposed sequentially along the propagation path of the pulse light. The Q switches 38A, 38B and driving section 39 constitute Q switch means that modulate the resonator loss of the resonator. Further, the pumping light source 32 and optical coupler 33 constitute pumping light supply means for continuously supplying pumping light to the optical amplification waveguide 31.

The control section 50B controls the Q switch means such that the resonator loss of the resonator of the subsequent-stage optical amplifier 30B is minimal with the timing at which the pulse light outputted from the seed light source 10 is inputted to the subsequent-stage optical amplifier 30B after being amplified by the pre-stage optical amplifier 20.

The light source apparatus 2 of the second embodiment operates as follows under the control of the control section 50B. The pumping light, that is outputted from the pumping light source 22 in the pre-stage optical amplifier 20, is continuously supplied to the optical amplification waveguide 21 via the optical coupler 23. Further, the pumping light, that is outputted from the pumping light source 32 in the subsequent-stage optical amplifier 30B, is continuously supplied to the optical amplification waveguide 31 via the optical coupler 33. In the seed light source 10, pulse light is outputted with a constant repetition cycle from the semiconductor laser element 11 that is driven by the driving section 12.

The pulse light outputted from the seed light source 10 is inputted to the pre-stage optical amplifier 20 via the optical isolator 41. The pulse light inputted to the pre-stage optical amplifier 20 is inputted to the optical amplification waveguide 21 via the optical coupler 23 and undergoes primary amplification in the optical amplification waveguide 21. The pulse light outputted from the pre-stage optical amplifier 20 is inputted to the subsequent-stage optical amplifier 30B via the optical isolator 42.

The pulse light inputted to the subsequent-stage optical amplifier 30B is inputted to the optical amplification waveguide 31 via the optical coupler 34B and optical coupler 33 together with the pulse light that arrives via the optical light waveguide 35B (is amplified in the optical amplification waveguide 31). The pulse light amplified in the optical amplification waveguide 31 is inputted to the optical coupler 34A. Part of the pulse light is guided to the optical waveguide 35A while the remainder of the pulse light is outputted to the outside of the subsequent-stage optical amplifier 30B via the optical isolator 37.

The pulse light that is inputted to the optical waveguide 35A by the optical coupler 34A is inputted to the Q switch 38A from the exit end of the optical waveguide 35A after propagating through the optical waveguide 35A. Thereafter, the resonator loss of the resonator in the subsequent-stage optical amplifier 30B is minimal with the timing at which pulse light is inputted to the subsequent-stage optical amplifier 30B. In other words, pulse light that is inputted from the optical waveguide 35A to the Q switch 38A is totally reflected by the Q switch 38A at the total reflection end.

The totally reflected pulse light sequentially passes through the Q switch 38A, the optical waveguide 35A, the optical coupler 34A, the optical amplification waveguide 31, the optical coupler 33, the optical coupler 34B, and the optical waveguide 35B and is then inputted to the Q switch 38B. The pulse light that is inputted to the Q switch 38B from the optical waveguide 35B is once again totally reflected at the total reflection end by the Q switch 38B. Thus, the pulse light inputted to the subsequent-stage optical amplifier 30B is amplified by the Fabry-Perot-type resonator and then is outputted from the optical coupler 34A to the outside of the subsequent-stage optical amplifier 30B via the optical isolator 37.

Before pulse light is inputted to the subsequent-stage optical amplifier 30B, the resonator loss of the resonator in the subsequent-stage optical amplifier 30B is not minimized. The energy of the pumping light supplied by the pumping light source 32 to the optical amplification waveguide 31 via the optical coupler 33 is accumulated as an inverted population in the optical amplification waveguide 31. Further, the resonator loss of the resonator in the subsequent-stage optical amplifier 30B is minimal with the timing at which the pulse light is inputted to the subsequent-stage optical amplifier 30B. Hence, the inputted pulse light is amplified with a high gain by means of the pumping energy that has accumulated as an inverted population in the optical amplification waveguide 31 thus far. Furthermore, there is barely any variation in the pulse width of the pulse light before or after amplification. Hence, the light source apparatus 2 is able to output short pulse light with a high pulse peak or high pulse energy that compares favorably with the case of a Q switch laser light source.

Further, the control section 50B preferably adjusts the delay between the two timings by controlling the timing with which the seed light source 10 outputs pulse light and controls the timing with which the resonator loss of the resonator in the subsequent-stage optical amplifier 30B is minimal. In this case, the Q switch means can be controlled such that the resonator loss of the resonator in the subsequent-stage optical amplifier 30B is minimal with the timing at which the pulse light is inputted to the subsequent-stage optical amplifier 30B.

Further, even in a case where the pulse light does not enter the subsequent-stage optical amplifier 30B, the subsequent-stage optical amplifier 30B performs pulse oscillation by means of the action of the Q switch means (pulse light output is possible). In this case, as compared with the pulse width of the pulse light outputted from the subsequent-stage optical amplifier 30B, the pulse width of the pulse light outputted from the seed light source 10 is preferably narrow. This is because the thermal effect on the irradiated object owing to the high-energy pulse irradiation can be effectively suppressed. Furthermore, the pulse width of the pulse light outputted from the seed light source 10 is preferably 16 nanoseconds or less. In this case, the effect of induced Brillouin scattering (SBS) can be effectively suppressed.

The cycle of the modulation of the resonator loss of the resonator in the subsequent-stage optical amplifier 30B may match the cycle of the pulse light output of the seed light source 10 and may be N times (where N is an integer of two or more) the cycle of the pulse light output in the seed light source 10. In the latter case, it is expected that a cyclical mixture of (N−1) small pulses and one large pulse arise at the output from the light source apparatus 2, with the (N−1) small pulses having the effect of providing preheat.

Third Embodiment

Figure 5:
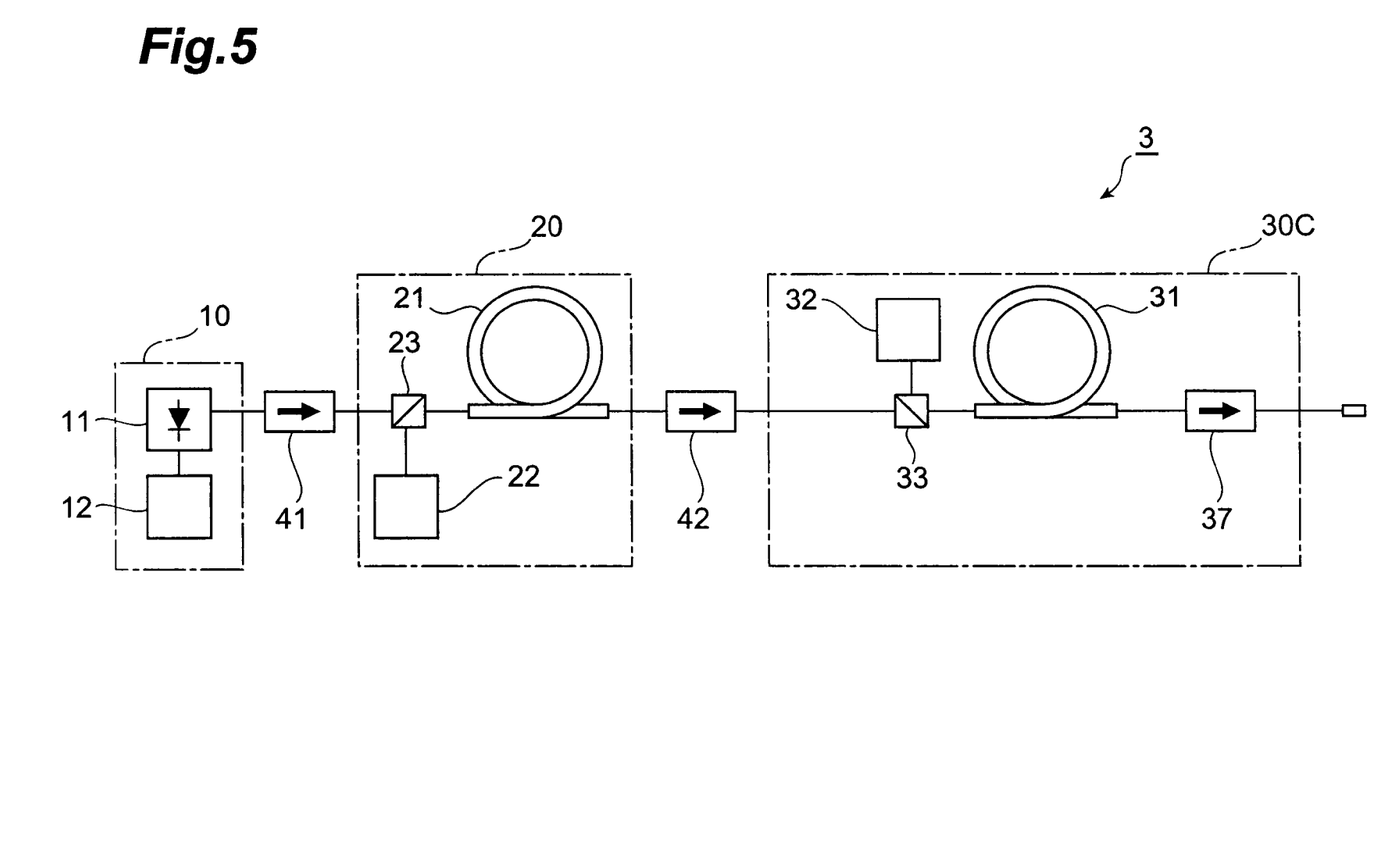
FIG. 5 shows the constitution of the third embodiment of the light source apparatus of the present invention.

The third embodiment of the light source apparatus of the present invention will be described next. FIG. 5 shows the constitution of the third embodiment of the light source apparatus of the present invention. The light source apparatus 3 according to the third embodiment shown in FIG. 5 comprises a seed light source 10, a pre-stage optical amplifier 20 (second optical amplifier), a subsequent stage optical amplifier 30C (first optical amplifier), an optical isolator 41, and an optical isolator 42. As compared with the constitution of the light source apparatus 2 of the second embodiment shown in FIG. 4, the light source apparatus 3 of the third embodiment is different by virtue of comprising the subsequent-stage optical amplifier 30C in place of the subsequent-stage optical amplifier 30B and by virtue of not comprising the control section 50B.

The subsequent-stage optical amplifier 30C further amplifies pulse light that is outputted from the pre-stage optical amplifier 20 and that arrives via the optical isolator 42 (pulse light that has undergone primary amplification in the pre-stage optical amplifier 20). The subsequent-stage optical amplifier 30C comprises the optical amplification waveguide 31, the pumping light source 32, the optical coupler 33, and the optical isolator 37. The subsequent-stage optical amplifier 30C does not comprise a resonator structure.

The optical amplification waveguide 31 is an optical waveguide rendered by doping the optical waveguide region with an amplification element and comprises an optical fiber rendered by doping the optical waveguide region with a Yb element, for example. The pumping light source 32 is a seed light source that continuously outputs pumping light that excites the doped amplification element to the optical amplification waveguide 31. The optical coupler 33 outputs the pulse light arriving from the optical isolator 42 to the optical amplification waveguide 31 and also outputs pumping light arriving from the pumping light source 32 to the optical amplification waveguide 31. The inputted pulse light is amplified by the optical amplification waveguide 31 in which an inverted population state is formed by the supply of pumping light and the amplified pulse light is outputted to the outside of the subsequent-stage optical amplifier 30C via the optical isolator 37.

In the third embodiment, the output cycle of the pulse light from the seed light source 10 is set equal to or more than the pumping lifespan of the amplification element with which the optical amplification waveguide 31 is doped and, more specifically, set longer than about 1/10 of the pumping lifespan. Further, the extinction ratio of the output pulse light is set at around 1000 or more. Further, when the pulse light from the seed light source 10, having been subjected to primary amplification by the pre-stage optical amplifier 20, is inputted to the subsequent-stage optical amplifier 30C, the energy that has accumulated as an inverted population in the optical amplification waveguide 31 thus far is released at once.

Figure 6:
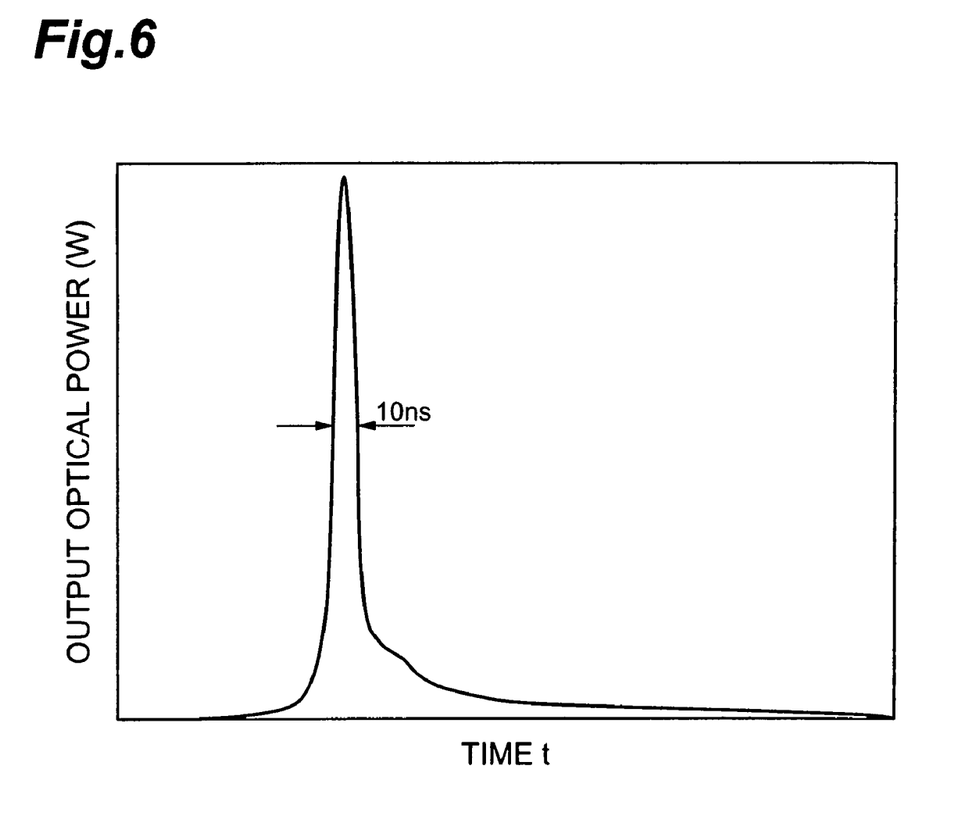
FIG. 6 is a temporal waveform of pulse light that is outputted from the light source apparatus according to a third embodiment.

Thus, even when the subsequent-stage optical amplifier 30C has a resonator structure, as a result of establishing the output cycle of the pulse light from the seed light source 10 equal to or more than the pumping lifespan of the amplification element with which the optical amplification waveguide 31 is doped, a short pulse light output with a high pulse energy or pulse peak that compares favorably with the case of the Q switch laser light source is obtained. FIG. 6 is a temporal waveform of pulse light that is outputted from the light source apparatus according to the third embodiment. As shown in FIG. 6, so too with the third embodiment, the full width at half maximum of the output pulse light is substantially equal to the full width at half maximum of the pulse light outputted from the seed light source 10. The trailing part of the temporal waveform of the output pulse light of FIG. 6 falls at the next constant equal to or more than a few μs.

As mentioned hereinabove, according to the light source apparatus of the present invention, in a constitution that comprises an optical amplifier that contains, as an optical amplification medium, an optical amplification waveguide, a short pulse light output with a high pulse energy or pulse peak that compares favorably with the case of the Q switch laser light source is possible.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A light source apparatus, comprising:
a seed light source outputting pulse light;
a first optical amplifier inputting the pulse light outputted from said seed light source and outputting the amplified pulse light, said first optical amplifier including: an optical amplification waveguide with an optical amplification function obtained by doping its optical waveguide region with an optical amplification element for amplifying light; and pumping light supply means for continuously supplying pumping light for pumping the amplification element to said optical amplification waveguide; and
a control section for controlling said seed light source so that the output cycle of the pulse light is longer than the fluorescence time constant of the amplification element and so that the ratio of a peak value of the pulse light from said seed light source with respect to an optical power outputted from said seed light source in an inter-pulse time region is 1000 times or more.

2. A light source apparatus according to claim 1, further comprising a second optical amplifier disposed between said seed light source and said first optical amplifier, said second amplifier inputting the pulse light outputted from said seed light source and outputting the amplified pulse light to said first optical amplifier.

3. A light source apparatus according to claim 1, wherein said seed light source includes a semiconductor laser element that is directly modulated.

4. A light source apparatus according to claim 1, wherein said first amplifier further includes: a resonator on the resonance light path of which an optical amplification waveguide is disposed; and Q switch means for modulating the resonator loss of said resonator.

5. A light source apparatus according to claim 1, wherein the pulse width of the pulse light, outputted from said seed light source, is set or can be set so as to be narrower than the pulse width of the pulse-oscillated output light from said first optical amplifier in a circumstance where only the pumping light is continuously supplied in a state where the pulse light is not inputted to said first optical amplifier.

6. A light source apparatus according to claim 1, wherein the pulse width of the pulse light outputted from said seed light source is set or can be set at 16 nanoseconds or less.

7. A light source apparatus, comprising:
a seed light source outputting pulse light; and
a first optical amplifier inputting the pulse light outputted from said seed light source and outputting the amplified pulse light, said first optical amplifier including: an optical amplification waveguide with an optical amplification function obtained by doping its optical waveguide region with an optical amplification element for amplifying light; a resonator on the resonance light path of which said amplification waveguide is disposed; pumping light supply means for continuously supplying pumping light for pumping the amplification element to said optical amplification waveguide; and Q switch means for modulating the resonator loss of said resonator, wherein said resonator includes, a first optical coupler disposed at a pulse light input end side of said optical amplification waveguide; a second optical coupler disposed at a pulse output end side of said amplification waveguide; a first optical waveguide whose one end is optically connected to a pulse input end of said first optical coupler; a second optical waveguide whose one end is optically connected to a pulse output end of said second optical coupler; and said Q switch means disposed between the other ends of said first and second optical waveguides, wherein said second optical coupler further has an output port which does not constitute a part of said resonator, and wherein said Q switch means is controlled such that the pulse light is amplified in the resonance state of said resonator and such that the pulse light is input to said first optical amplifier in sync with the modulation cycle of the resonator loss.

8. A light source apparatus, comprising:

a seed light source outputting pulse light; and a first optical amplifier inputting the pulse light outputted from said seed light source and outputting the amplified pulse light, said first optical amplifier including: an optical amplification waveguide with an optical amplification function obtained by doping its optical waveguide region with an optical amplification element for amplifying light; a resonator on the resonance light path of which said amplification waveguide is disposed; pumping light supply means for continuously supplying pumping light for pumping the amplification element to said optical amplification waveguide; and Q switch means for modulating the resonator loss of said resonator, wherein said Q switch means is controlled such that the pulse light is amplified in the resonance state of said resonator and such that the pulse light is input to said first optical amplifier in sync with the modulation cycle of the resonator loss, and wherein said control section controls said Q switch means such that the pulse light is amplified with said resonator in the resonance state and such that the modulation cycle of the resonator loss is N times (where N is an integer of two or more) the pulse light output cycle of said seed light source.

9. A light source apparatus according to claim 7, further comprising a second optical amplifier disposed between said seed light source and said first optical amplifier, said second optical amplifier inputting the pulse light outputted from said seed light source and outputting the amplified pulse light to said first optical amplifier.

10. A light source apparatus according to claim 7, wherein said seed light source includes a semiconductor laser element that is directly modulated.

11. A light source apparatus according to claim 7, wherein the pulse width of the pulse light, outputted from said seed light source, is set or can be set so as to be narrower than the pulse width of the pulse-oscillated output light from said first optical amplifier in a circumstance where only the pumping light is continuously supplied in a state where the pulse light is not input to said first optical amplifier.

12. A light source apparatus according to claim 7, wherein the pulse width of the pulse light outputted from said seed light source is set or can be set at 16 nanoseconds or less.

13. A light source apparatus comprising:

a seed light source outputting pulse light;

a first optical amplifier inputting the pulse light outputted from said seed light source and outputting the amplified pulse light, said first optical amplifier including: an optical amplification waveguide with an optical amplification function obtained by doping its optical waveguide region with an optical amplification element for amplifying light; and pumping light supply means for continuously supplying pumping light for pumping the amplification element to said optical amplification waveguide; and a control section for controlling said seed light source so that the output cycle of the pulse light is longer than $\frac{1}{10}$ of the fluorescence time constant of the amplification element and so that the ratio of a peak value of the pulse light from said seed light source with respect to an optical power outputted from said seed light source in an inter-pulse time region is 1000 times or more, wherein said control section controls said Q switch means such that the pulse light is amplified with said resonator in the resonance state and such that the modulation cycle of the resonator loss is N times (where N is an integer of two or more) the pulse light output cycle of said seed light source, and wherein said first amplifier further includes: a resonator on the resonance light path of which an optical amplification waveguide is disposed; and Q switch means for modulating the resonator loss of said resonator.

14. A light source apparatus according to claim 1, wherein said control section controls said seed light source so that the output cycle of the pulse light is not longer than fluorescence time constant of the amplification element.

15. A light source apparatus according to claim 1, wherein said control section controls said seed light source so that the output cycle of the pulse light is longer than fluorescence time constant of the amplification element.

16. A light source apparatus, comprising:

a seed light source outputting pulse light; and a first optical amplifier inputting the pulse light outputted from said seed light source and outputting the amplified pulse light, said first optical amplifier including: an optical amplification waveguide with an optical amplification function obtained by doping its optical waveguide region with an optical amplification element for amplifying light; a resonator on the resonance light path of which said amplification waveguide is disposed; pumping light supply means for continuously supplying pumping light for pumping the amplification element to said optical amplification waveguide; and Q switch means for modulating the resonator loss of said resonator, wherein said resonator includes: a first optical coupler disposed at a pulse light input end side of said optical amplification waveguide; a second optical coupler disposed at a pulse output end side of said amplification waveguide; a first optical waveguide whose one end is optically connected to a pulse input end of said first optical coupler; a second optical waveguide whose one end is optically connected to a pulse output end of said second optical coupler; and said Q switch means including elements respectively disposed at the other end side of said first optical waveguide and the other end side of said second optical waveguide, wherein said second optical coupler further has an output port which does not constitute a part of said resonator, and wherein said Q switch means is controlled such that the pulse light is amplified in the resonance state of said resonator and such that the pulse light is input to said first optical amplifier in sync with the modulation cycle of the resonator loss.

17. A light source apparatus according to claim 16, further comprising a second optical amplifier disposed between said seed light source and said first optical amplifier, said second optical amplifier inputting the pulse light outputted from said seed light source and outputting the amplified pulse light to said first optical amplifier.

18. A light source apparatus according to claim 16, wherein said seed light source includes a semiconductor laser element that is directly modulated.

19. A light source apparatus according to claim 16, wherein the pulse width of the pulse light, outputted from said seed light source, is set or can be set so as to be narrower than the pulse width of the pulse oscillated output light from said first optical amplifier in a circumstance where only the pumping light is continuously supplied in a state where the pulse light is not input to said first optical amplifier.

20. A light source apparatus according to claim 16, wherein the pulse width of the pulse light outputted from said seed light source is set or can be set at 16 nanoseconds or less.

* * * * *